United States Patent
Kim et al.

(10) Patent No.: US 6,779,189 B2
(45) Date of Patent: Aug. 17, 2004

(54) OPTICAL DISK CHANGER

(75) Inventors: Tae-myun Kim, Gyeonggi-do (KR); Go-hyun Kim, Gyeonggi-do (KR); Dong-man Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 10/032,160

(22) Filed: Dec. 31, 2001

(65) Prior Publication Data

US 2003/0043704 A1 Mar. 6, 2003

(30) Foreign Application Priority Data

Aug. 28, 2001 (KR) .......................................... 2001-52106

(51) Int. Cl.⁷ ......................... G11B 17/03; G11B 17/04; G11B 33/02; G11B 21/08; G11B 7/085
(52) U.S. Cl. ..................... 720/601; 720/608; 369/30.98
(58) Field of Search ........................... 369/30.98, 30.93, 369/30.9, 30.75, 30.6, 30.48, 77.1, 191, 77.2, 30.94, 30.97, 77.11, 75.21; 720/601, 600, 608, 615

(56) References Cited

U.S. PATENT DOCUMENTS 5,742,571 A * 4/1998 Hoshino et al. ......... 369/30.98
6,061,320 A * 5/2000 Tsai ........................ 369/75.21

FOREIGN PATENT DOCUMENTS

KR 1999-25985 4/1999
TW 383126 2/2000

* cited by examiner

Primary Examiner—Julie Anne Watko
(74) Attorney, Agent, or Firm—Staas & Halsey LLP (57) ABSTRACT

An optical disc changer includes a main body, a tray installed in the main body to be capable of sliding, a roulette rotatably installed at the tray and where a plurality of optical discs are accommodated, an optical pickup device to selectively reproduce one of the optical discs accommodated on the roulette, a drive gear member installed at the main body, rotated by being connected to a drive unit, and selectively engaged with a rack gear member formed on the bottom surface of the tray, and a tray gear unit installed adjacent to the drive gear member and having a tray gears selectively engaged with the rack gear member and the drive gear member.

14 Claims, 6 Drawing Sheets

OPTICAL DISK CHANGER

CROSS-REFERENCE TO RELATED APPLICATIONS

This application claims the benefit of Korean Patent Application No. 2001-52106 filed on Aug. 28, 2001, in the Korean Industrial Property Office, the disclosure of which is incorporated herein by reference.

BACKGROUND OF THE INVENTION

1. Field of the Invention

The present invention relates to an optical disc changer, and more particularly, to an optical disc changer adopting a tray transfer unit which is simplified by reducing the number of parts.

2. Description of the Related Art

In general, optical disc drives reproduce information recorded on optical discs such as CDs or DVDs, which are optical recording media, by using optical pickup devices. When an optical disc is placed on a tray and loaded in a drive, a drive unit rotates the optical disc. An optical pickup device mounted at the lower end of the tray reproduces data recorded on the optical disc while being transferred in a radial direction of the optical disc.

Since only one optical disc is accommodated on the tray of the optical disc drive, if a user wishes to reproduce a plurality of optical discs, the user must inconveniently repeat actions including ejecting the tray, placing a new optical disc that the user wishes to reproduce on the tray, and loading the tray in the drive.

To solve the above inconveniences, optical disc changers to selectively reproduce one of a plurality of optical discs accommodated on a tray, so as not to repeatedly change the optical discs, have been developed.

Figure 1:
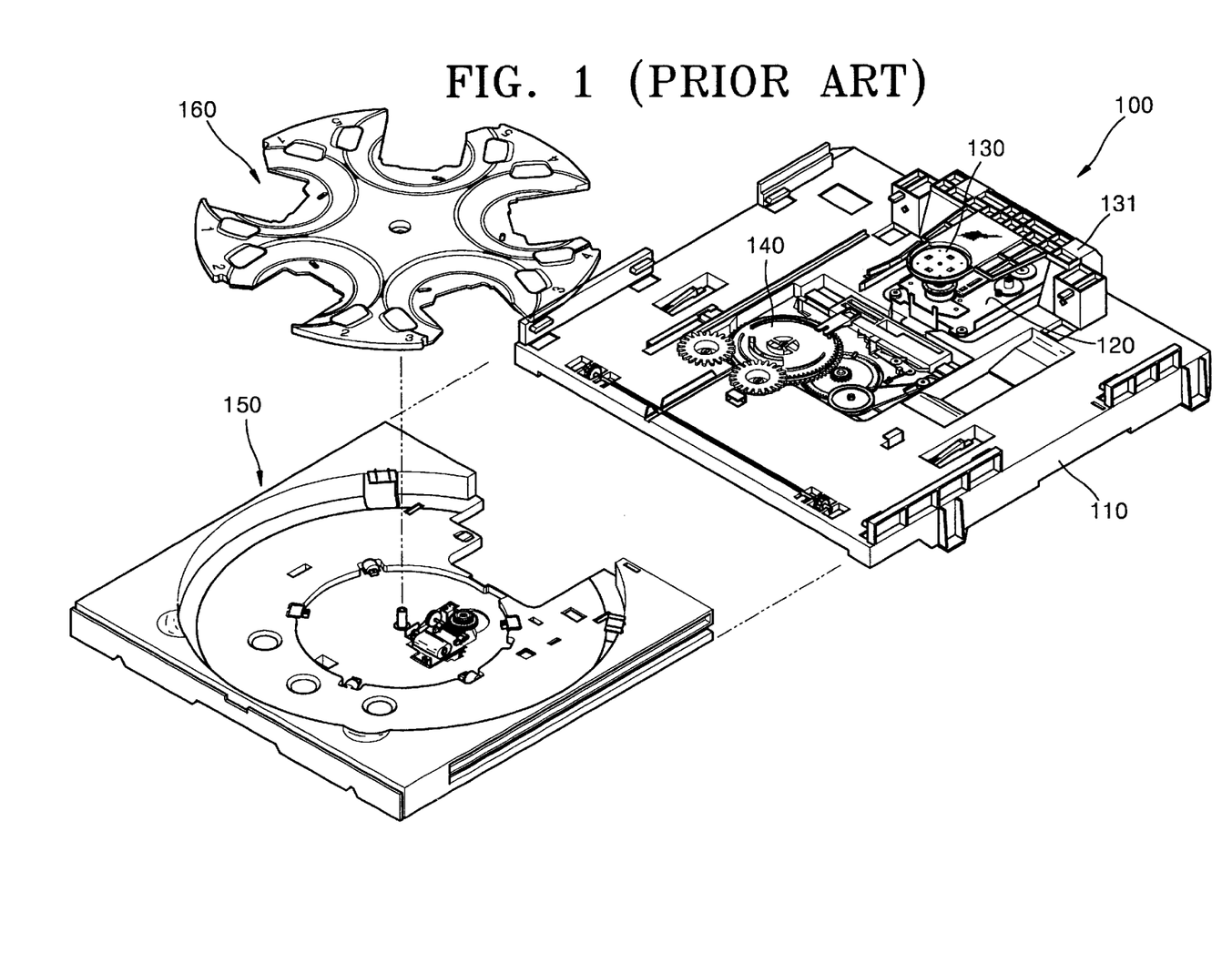
FIG. 1 is a perspective view of a conventional optical disc changer.

FIG. 1 shows a perspective view showing a conventional front loading type optical disc changer to select a desired one of a plurality of optical discs accommodated on a tray and reproduce the selected optical disc by using an optical pickup device. Referring to FIG. 1, a conventional optical disc changer 100 includes a main body 110, a tray 150 installed to be capable of being inserted into the main body 110, a roulette 160 rotatably installed on the tray 150 and where a plurality of optical discs are accommodated, an optical pickup device 120 to read information from a desired one of the optical discs accommodated on the roulette 160, and a damper support unit 131 installed above the optical pickup device 120 to support a damper 130 which clamps the optical discs against the optical pickup device 120.

Also, the optical disc changer 100 includes a tray transfer unit 140 to load or unload the tray 150 in or from the main body 110.

The optical disc changer 100 loads the tray 150 in the main body 110 to perform reproduction by using the optical pickup device 120, or unloads the tray 150 after reproduction by the optical pickup device 120 is completed. Also, there is a need to load or unload the tray 150 while one of the optical discs is selected and being reproduced by using the optical pickup device 120.

Figure 2:
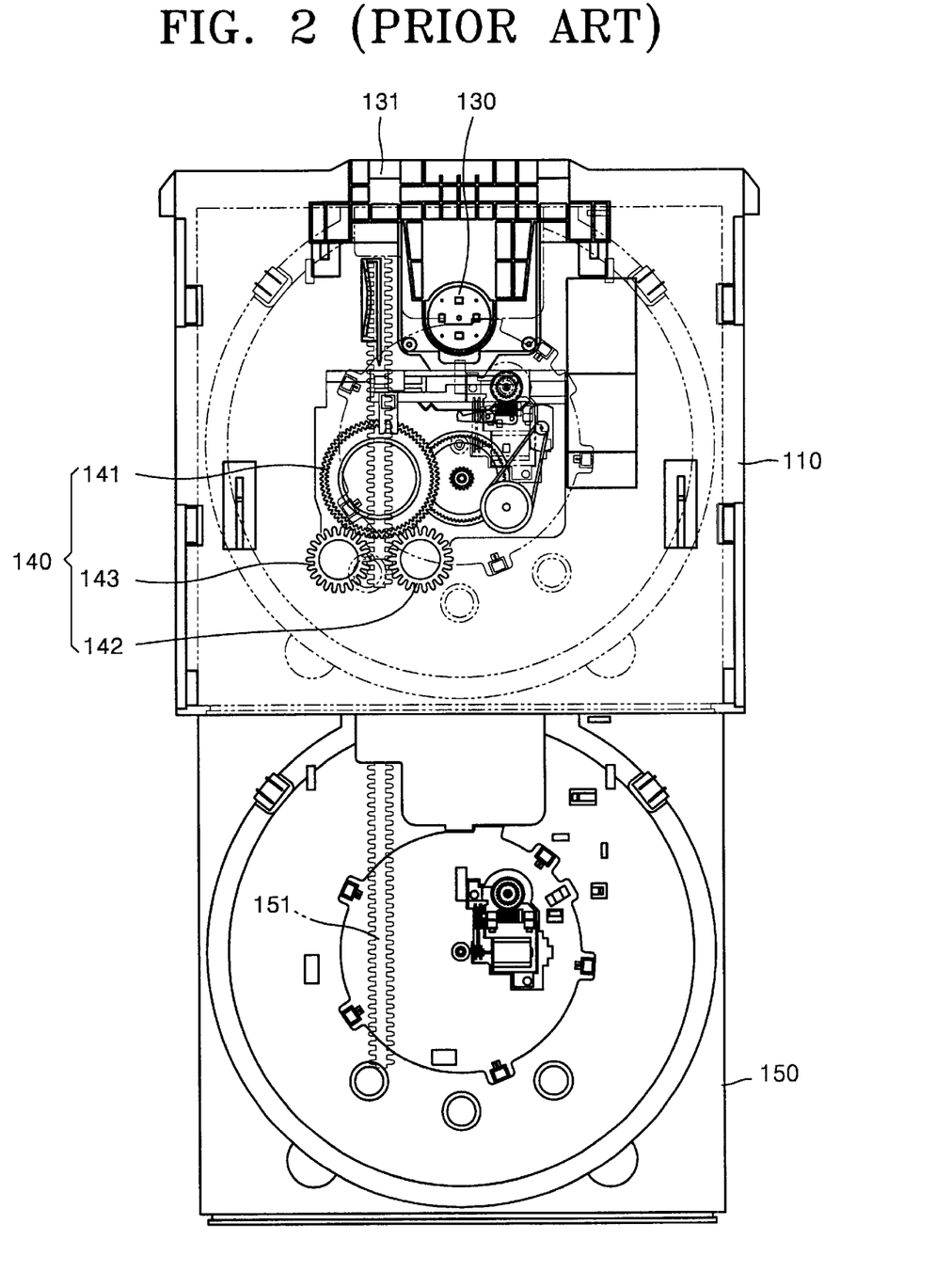
FIG. 2 is a plan view of the tray transfer unit of FIG. 1.

FIG. 2 is a plan view of a tray transfer unit shown in FIG. 1. FIG. 2, illustrates a tray transfer unit 140 of the conventional optical disc changer 100, a drive gear member 141, a tray gear member 142 rotating by selectively being engaged with the drive gear member 141, and a converter gear member 143. A rack gear member 151, having a rack gear formed at both sides thereof, is provided at the bottom surface of the tray 150 so that it engages with the tray gear member 142 and the converter gear member 143 and passes between the tray gear member 142 and the converter gear member 143 as both of these members rotate.

When the tray transfer unit 140 loads or unloads the tray 150, the tray gear member 142 is engaged with the drive gear member 141. When the optical disc is being reproduced while the tray 150 is simultaneously loaded or unloaded, the converter gear member 143 and the drive gear member 141 are engaged with each other.

In the conventional optical disc changer 100, since the converter gear member 143 is additionally used, the cost of manufacturing the optical disc changer 100 increases. Also, to assemble the tray gear member 142, the converter gear member 143, and the rack gear member 151, since an accurate assembly point must be kept, the assembly work is difficult and the number of defective parts increases.

SUMMARY OF THE INVENTION

Accordingly, it is an object of the present invention to provide an optical disc changer adopting a tray transfer unit which is simplified by reducing the number of parts.

Additional objects and advantages of the invention will be set forth in part in the description which follows and, in part, will be obvious from the description, or may be learned by practice of the invention.

The foregoing and other objects of the present invention are achieved by providing an optical disc changer comprising a main body, a tray installed in the main body to be capable of sliding, a roulette rotatably installed at the tray and where a plurality of optical discs are accommodated, an optical pickup device to selectively reproduce one of the optical discs accommodated on the roulette, a drive gear member installed at the main body, rotated by being connected to a drive unit, and selectively engaged with a rack gear member formed on the bottom surface of the tray, and a tray gear unit installed adjacent to the drive gear member and having tray gears selectively engaged with the rack gear member and the drive gear.

BRIEF DESCRIPTION OF THE DRAWINGS

These and other objects and advantages of the present invention will become apparent and more readily appreciated from the following description of the embodiments, taken in conjunction with the accompany drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
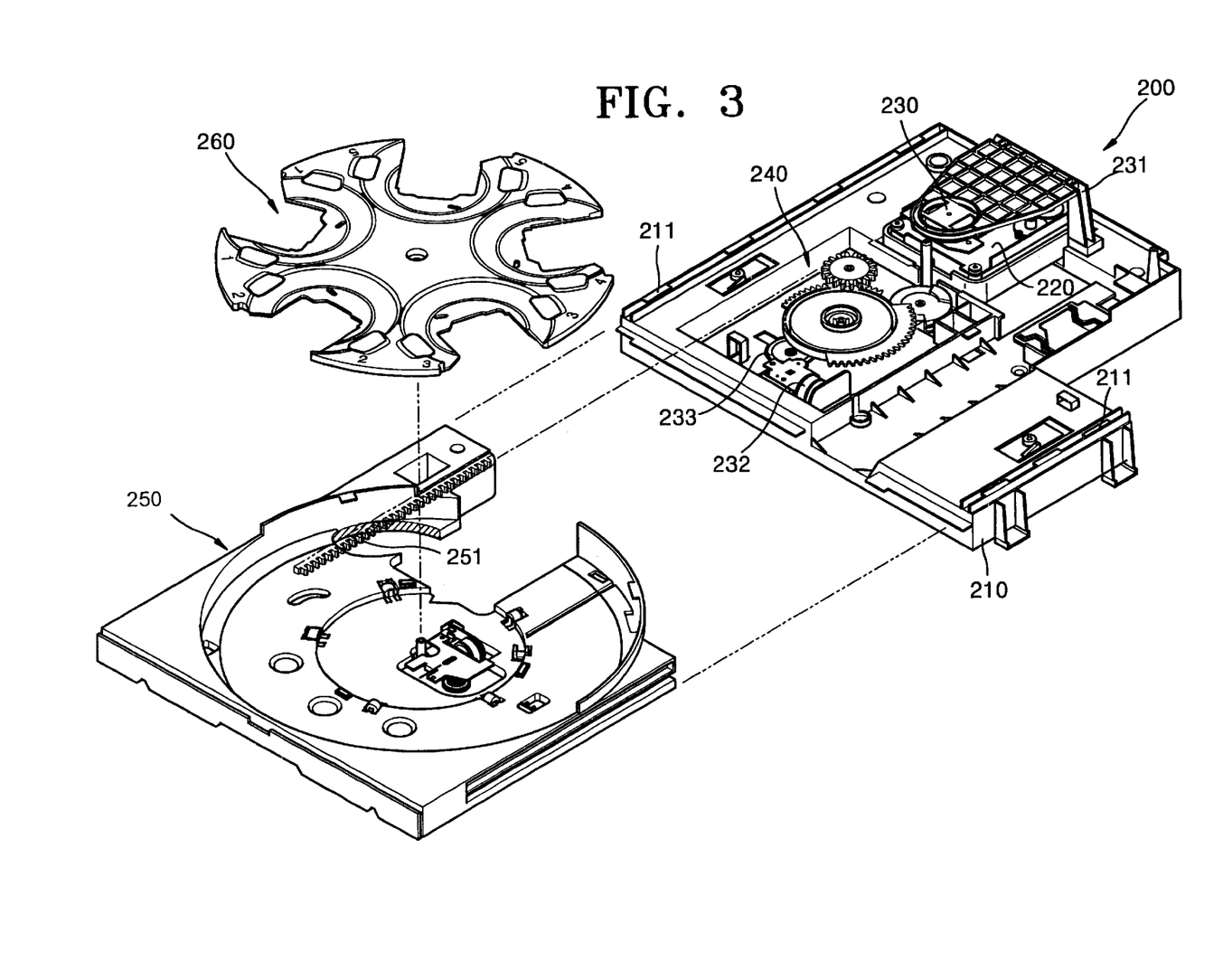
FIG. 3 is a perspective view of an optical disc changer according to the present invention.

Referring to FIG. 3, an optical disc changer 200 adopting a tray transfer unit 240 according to the present invention includes a main body 210, a tray 250 loaded and unloaded along a guide member 211 provided at the main body 210, a roulette 260 rotatably installed at the tray 250 and where a plurality of optical discs are accommodated, an optical pickup device 220 installed at the main body 210 to be capable of pivoting up and down to selectively reproduce the optical discs accommodated on the roulette 260, and a damper support unit 231 installed at the main body 210 to support a damper 230 which clamps the optical pickup device 220 and the optical disc. Also, a tray transfer unit 240 to load and load the tray 250 in and from the main body 210 is provided.

Figure 4:
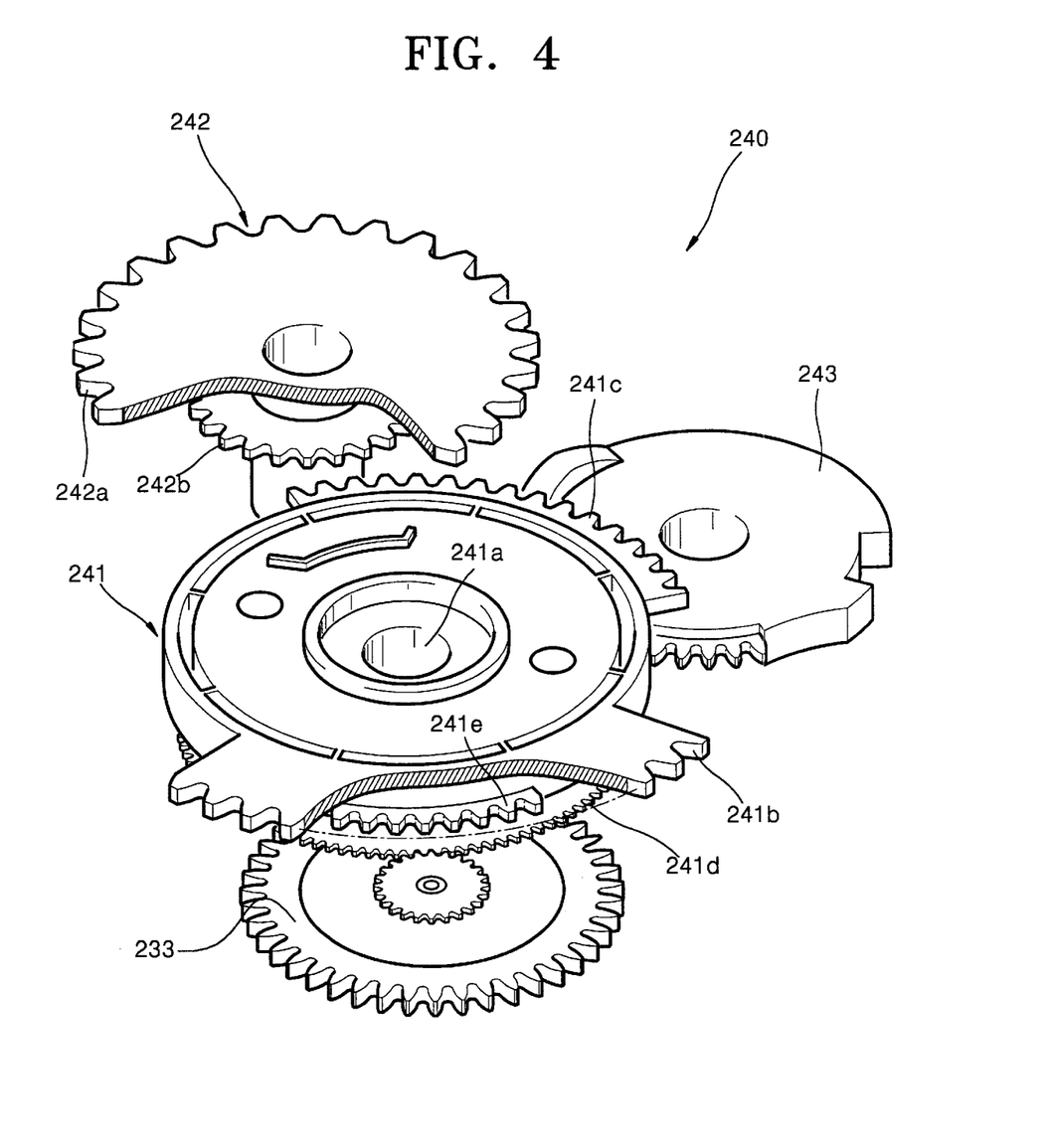
FIG. 4 is an exploded perspective view of the tray transfer unit of FIG. 3.

FIG. 4 shows the tray transfer unit of FIG. 3. Referring to FIG. 4, the tray transfer unit 240 comprises a drive gear member 241 installed at the main body 210 and rotated by being engaged with a drive unit 232 (see FIG. 3) and a connection gear 233, and a tray gear unit 242 installed adjacent to the drive gear member 241 and selectively engaged with the drive gear member 241 and a rack gear member 251 (see FIG. 3) formed at the bottom surface of the tray 250.

The drive gear member 241 has a through hole 241a formed at the center thereof. A first gear 241b and a second gear 241c protrude from the outer circumference of the drive gear member 241 to have predetermined arc lengths.

A third gear 241d is formed along the outer circumference of the lower portion of the drive gear member 241. Also, an optical pickup raising gear 241e having a predetermined arc length is formed between the first gear 241b and the third gear 241d. The optical pickup raising gear 241e is engaged with an optical pickup raising unit 243 installed adjacent to the drive gear member 241 and makes the optical pickup device 220 access the optical disc.

A shaft formed at the main body 210 is inserted in the through hole 241a so that the drive gear member 241 is capable of rotating with respect to the main body 210.

The first gear 241b is formed to extend a predetermined length in a radial direction from the upper portion of the drive gear member 241. The second gear 241c is formed to extend a predetermined length in a radial direction from a position lower than the first gear 241b. Here, the first gear 241b extends longer than the second gear 241c so that the first gear 241b is selectively engaged with the rack gear member 251.

The first and second gears 241b and 241c are formed on the circumference of the drive gear member 241. This is to make the tray gear unit 242 and the rack gear member 251 selectively engaged with each other when the tray 250 is loaded and unloaded. A detailed description of the above operation will be described later.

The third gear 241d is engaged with the connection gear 233 installed adjacent thereto and connected to the drive unit 232. Then, the power is transferred from the drive unit 232 to the drive gear member 241 and the drive gear member 241 is rotated in a forward direction (clockwise) and a reverse direction (counterclockwise). Thus, the drive gear member 241 is engaged with the rack gear member 251 and loads and unloads the tray 250.

The tray gear unit 242 is rotatably installed at the main body 210 and an upper gear 242a and a lower gear 242b are formed as part of the tray gear unit 242. The upper gear 242a is formed to have a diameter greater than the lower gear 242b. The upper and lower gears 242a and 242b are separated a predetermined distance from each other, the upper gear 242a being positioned above the lower gear 242b.

The lower gear 242b is engaged with the second gear 241c and the upper gear 242a is engaged with the rack gear member 251. Since the first gear 241b passes between the upper and lower gears 242a and 242b, the first gear 241b is not engaged with the tray gear unit 242.

The operation of loading and unloading of the tray in the optical disc changer adopting the tray transfer unit having the above structure according to the present invention will now be described.

Figure 5:
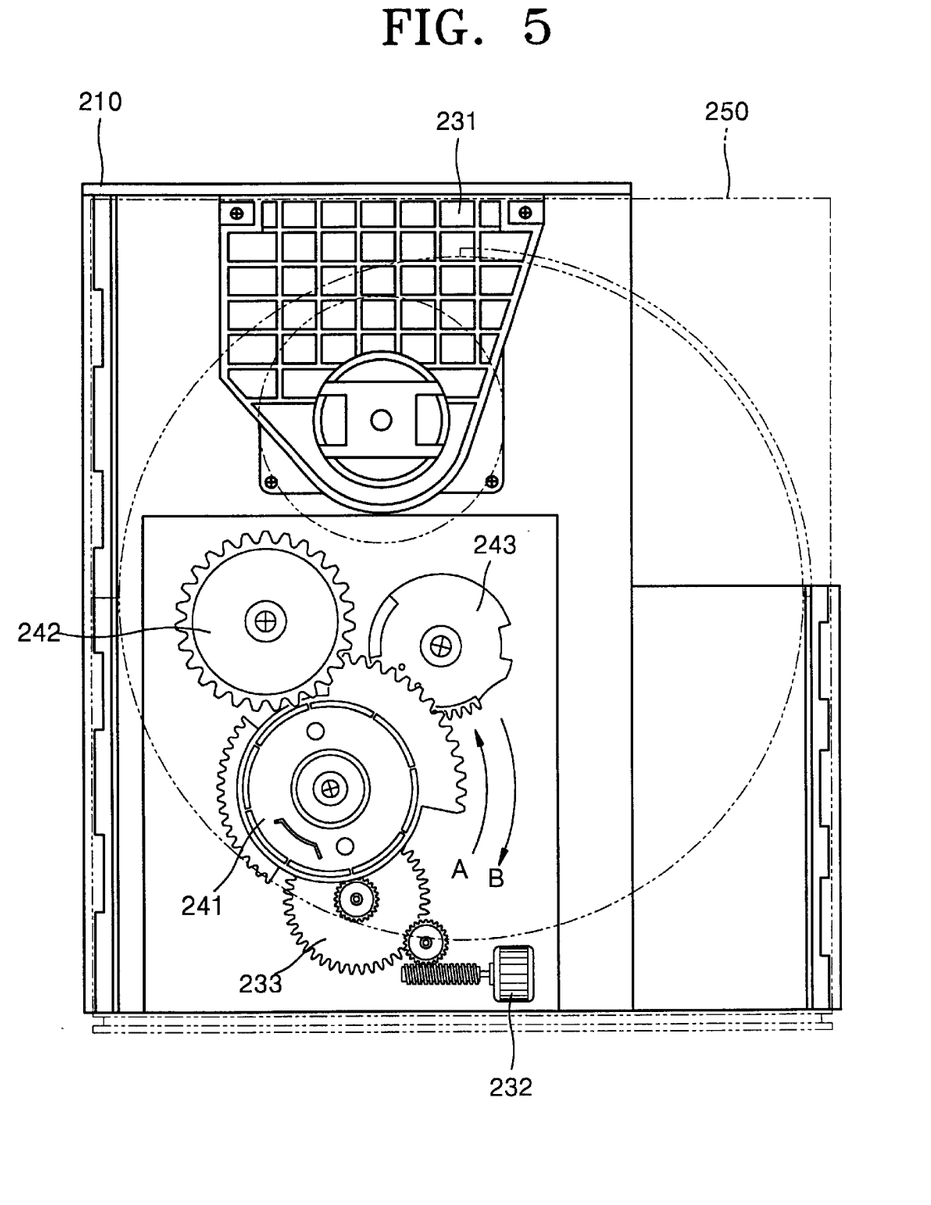
FIG. 5 is a plan view showing the state in which the tray shown in FIG. 3 is loaded in the main body.
Figure 6:
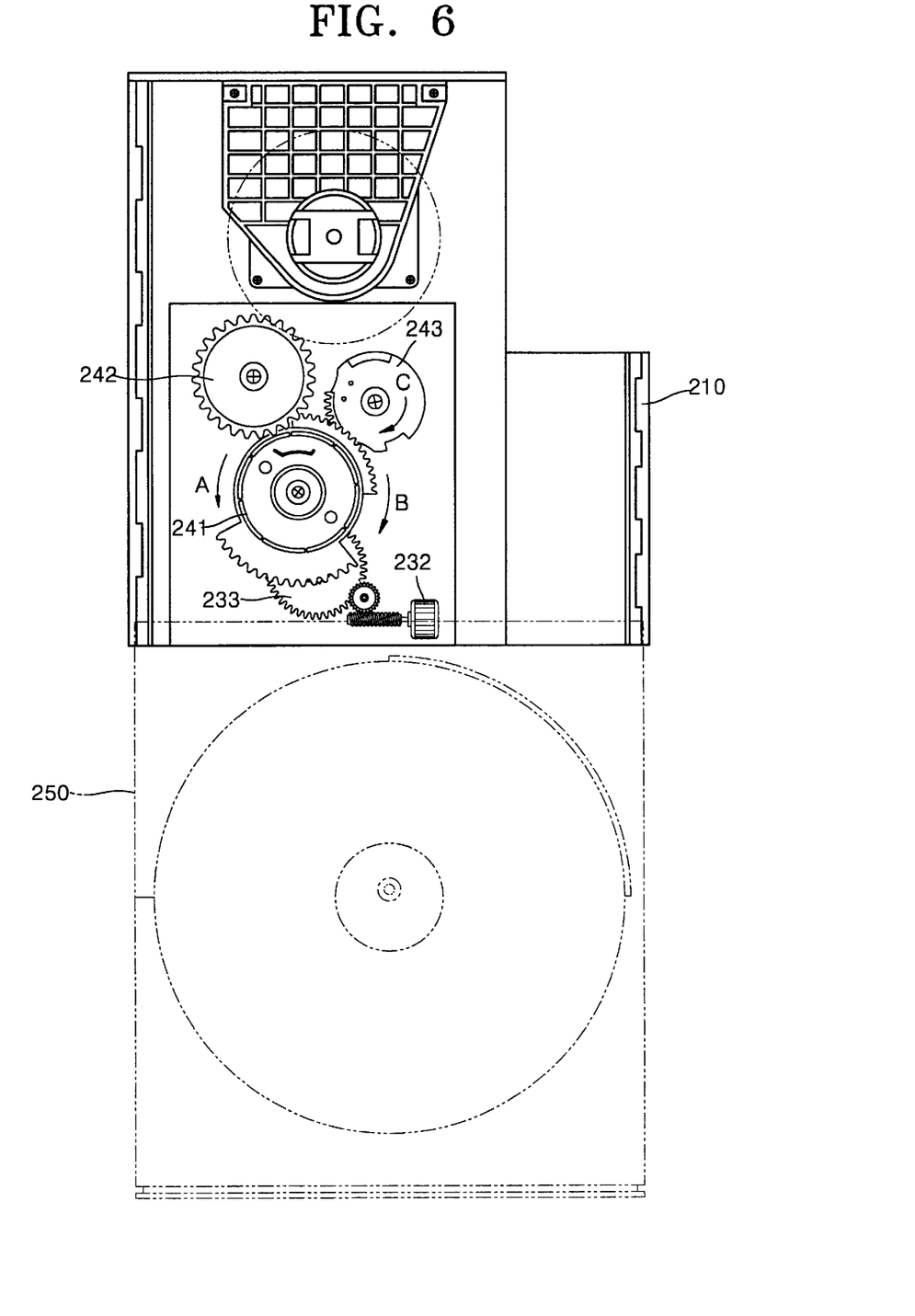
FIG. 6 is a plan view showing the state in which the tray is unloaded when the optical disc is reproduced by the optical pickup device shown in FIG. 3.

Here, the loading and unloading operations of the tray 250 can be divided into two operations. FIG. 5 shows the state in which the tray 250 shown in FIG. 3 is loaded in the main body 210. In FIG. 5, the tray 250, where a plurality of optical discs are accommodated on the roulette 260, is loaded within the mail body 210. FIG. 6 shows the state in which the tray 250 is unloaded from the main body 210 while the optical disc is being reproduced by the optical pickup device shown in FIG. 3. In FIG. 6, while one of the plurality of optical discs is being reproduced by the optical pickup device 220, the remaining optical discs are accommodated on the roulette 260 and the tray 250 is unloaded.

Referring to FIGS. 4 and 5, when the tray 250 is to be loaded within the main body 210, the power of the drive unit 232 is transferred to the connection gear 233, which is engaged with the third gear 241d. Then, the drive gear member 241 is rotated in a direction indicated by an arrow A. The second gear 241c engages the lower gear 242b and causes the upper gear 242a, which is engaged with the rack gear member 251, to rotate. Thus, the tray 250 is loaded in the main body 210.

In contrast with the above operations, when the tray 250 is to be unloaded from the main body 210, the drive gear member 241 is rotated in a direction indicated by an arrow B. Then, the tray 250 is unloaded from the main body 210.

Referring to FIGS. 4 and 6, in the state shown in FIG. 5, when the drive gear member 241 is rotated in the direction A, the tray 250 is completely loaded in the main body 210. Here, any one of the optical discs may be positioned above the optical pickup device 220. When the drive gear member 241 further rotates in the direction A by continuously receiving the power from the drive unit 232, the optical pickup raising gear 241e is engaged with the optical pickup raising unit 243 and rotates the optical pickup raising unit 232 in a direction indicated by an arrow C, thus providing for the optical pickup device 220 to access the optical disc.

When the drive gear member 241 continues to rotate in the direction A, the first gear 241b passes between the upper and lower gears 242a and 242b and engages the rack gear member 251. Thus, as the drive gear member 241 further rotates in the direction A, the tray 250 is unloaded from the main body 210. During this operation, the optical pickup device 220 continues to reproduce the optical disc.

When the tray 250 is to be loaded in the main body 210 and the drive gear member 241 is rotated in the direction B, the first gear 241b engages the rack gear member 251 and is rotated so that the tray 250 is loaded in the main body 210.

As described above, in the optical disc changer according to the present invention, since the tray transfer unit is simplified by reducing the number of parts, space is saved.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical disc changer comprising:

a main body;

a tray slidably moveable into and from the main body and having a rack gear member on a bottom surface of the tray;

a roulette rotatably installed at the tray and where a plurality of optical discs are accommodatable;

an optical pickup device to selectively reproduce one of the optical discs accommodated on the roulette;

a drive gear member installed at the main body, rotated by being connected to a drive unit, and selectively engaged with the rack gear member; and a tray gear unit installed adjacent to the drive gear member and having tray gears engaged with the rack gear member and selectively engaged with the drive gear member, wherein when the optical pickup device is reproducing one of the optical discs, tray movement is driven by engagement of the drive gear member and the rack pear member.

2. The optical disc changer as claimed in claim 1, wherein the drive gear member comprises:

a first gear formed at a predetermined arc length along the circumference of the drive gear member to engage with the rack gear member;

a second gear formed at a predetermined arc length lower than the first gear and selectively engaged with the tray gear member; and a third gear formed at the lower portion of the drive gear member than the first gear member to be coupled with the drive unit.

3. The optical disc changer as claimed in claim 2, wherein the first gear extends further from the drive gear member than the second gear.

4. The optical disc changer according to claim 3, further comprising a connection gear for connecting said drive unit with said third gear.

5. The optical disc changer as claimed in claim 2, further comprising:

an optical pickup raising unit to move the optical pickup device up and down with respect to the optical disc;

wherein the drive gear member further comprises an optical pickup raising gear which engages with the optical pickup raising unit to move the optical pickup device up and down with respect to the optical disc.

6. The optical disc changer according to claim 5, wherein said optical pick-up raising gear has a predetermined arc length and is positioned between said second gear and said third gear to selectively engage with said optical pickup raising unit.

7. The optical disc changer according to claim 5, wherein said optical pickup raising unit accesses the optical disc being reproduced when said optical pick-up raising gear engages with said optical pick-up raising unit.

8. The optical disc changer according to claim 7, wherein said first gear selectively engages with said rack gear to unload and load said tray when said optical pickup raising unit accesses the optical disc being reproduced.

9. The optical disc changer as claimed in claim 2, wherein the tray gear unit comprises:

an upper gear formed along the circumference of the tray gear unit to be engaged with the rack gear member; and a lower gear formed along the circumference of the tray gear unit to be selectively engaged with the second gear, and the upper and lower gears are separated a predetermined distance so that the first gear passes between the upper and lower gears during rotation.

10. The optical disc changer as claimed in claim 9, wherein the upper gear is formed to have a diameter greater than the lower gear.

11. The optical disc changer according to claim 9, wherein said first gear selectively engages with said rack gear to unload and load said tray when said optical pickup raising unit accesses the optical disc being reproduced.

12. An optical disc changer comprising:

a main body;

a tray slidably installed in the main body and having a rack gear member formed on the bottom surface thereof;

a roulette rotatably installed at said tray to accommodate a plurality of optical discs;

an optical pickup to selectively reproduce one of said optical discs accommodated on the roulette; and a tray transfer unit installed at said main body comprising:

a drive gear member driven by a drive unit and selectively engaged with said rack gear member to slide said tray; and a tray gear unit installed adjacent to the drive gear member and engaged with said rack gear member and selectively engaged with said drive gear member, wherein when the optical pickup reproduces one of said optical discs, tray movement is driven by engagement of the drive gear member and the rack gear member.

13. An optical disc changer comprising:

a main body;

a tray having a rack gear formed thereon and slidably installed into and from said main body;

a roulette rotatably installed at the tray accommodating a plurality of optical discs;

an optical pickup device selectively reproducing one of the optical discs accommodated on the roulette;

a drive gear member installed at the main body having a first gear, a second gear and a third gear formed coaxially thereon to rotate concurrently with each other, said first gear selectively engaging with said rack gear formed on the bottom surface of the tray; said second gear engaging with a tray gear member to load and unload said tray, and said third gear engaging with a drive gear and driving said drive gear member; and a tray gear unit installed adjacent to said drive gear member engaging with said rack gear member and selectively engaging with said drive gear member, wherein when the optical pickup device is reproducing one of the optical discs, tray movement is driven by engagement of the drive gear member and the rack gear member.

14. A tray transfer unit for an optical disc changer having a main body, a tray accommodating a plurality of optical discs and slidably moveable into and out of the main body, and an optical pickup device to selectively reproducing one of the optical discs, the tray transfer unit comprising:

a rack pear positioned on the tray;

a tray gear unit rotatably installed at the main body and having a tray gear member;

a drive gear member rotatably installed at the main body adjacent to the tray gear unit and having first and second gears positioned coaxially thereon, the first gear engaging the rack gear to drive movement of the tray when the optical pickup device is reproducing one of the optical discs, the second gear engaging the rack gear to otherwise drive movement of the tray.

* * * * *

UNITED STATES PATENT AND TRADEMARK OFFICE
CERTIFICATE OF CORRECTION

PATENT NO. : 6,779,189 B2
DATED : August 17, 2004
INVENTOR(S) : Tae-myun Kim et al.

It is certified that error appears in the above-identified patent and that said Letters Patent is hereby corrected as shown below:

Column 5,
Line 20, change "pear" to -- gear --

Column 6,
Line 56, change "pear" to -- gear --

Signed and Sealed this

Eleventh Day of January, 2005

JON W. DUDAS
*Director of the United States Patent and Trademark Office*